(12) United States Patent
Reyburn et al.

(10) Patent No.: US 10,791,676 B2
(45) Date of Patent: Oct. 6, 2020

(54) MODULAR COMBINE TRACTION AXLE

(71) Applicant: CNH Industrial America LLC, New Holland, PA (US)

(72) Inventors: Stanley Reyburn, Cochranville, PA (US); Joseph Russell Woelfling, Lancaster, PA (US); Kenneth Allan Ellis, Ephrata, PA (US); Scott Woytera, Ephrata, PA (US); Patrick Piens, Destelbergen (BE)

(73) Assignee: CNH Industrial America LLC, New Holland, PA (US)

( * ) Notice: Subject to any disclaimer, the term of this patent is extended or adjusted under 35 U.S.C. 154(b) by 262 days.

(21) Appl. No.: 15/938,124

(22) Filed: Mar. 28, 2018

(65) Prior Publication Data

US 2019/0297779 A1    Oct. 3, 2019

(51) Int. Cl.

| A01D 41/12 | (2006.01) |
|---|---|
| A01D 67/00 | (2006.01) |
| A01F 12/44 | (2006.01) |
| B60B 35/00 | (2006.01) |
| B60B 35/04 | (2006.01) |
| B60K 17/04 | (2006.01) |
| B60B 35/16 | (2006.01) |

(52) U.S. Cl.
CPC ............ *A01D 67/00* (2013.01); *A01F 12/444* (2013.01); *B60B 35/006* (2013.01); *B60B 35/04* (2013.01); *B60B 35/163* (2013.01); *B60K 17/046* (2013.01); *A01F 12/446* (2013.01)

(58) Field of Classification Search
CPC ....... A01D 41/12; A01D 67/00; A01F 12/444; B60B 35/006; B60B 35/04; B60B 35/163; B60K 17/046
USPC .............................................. 460/67, 98–100
See application file for complete search history.

(56) References Cited

U.S. PATENT DOCUMENTS

| 6,206,125 B1 | 3/2001 | Weddle |
|---|---|---|
| 6,929,334 B2 | 8/2005 | Verheye et al. |
| 7,559,403 B2 | 7/2009 | Schmitz |
| 7,585,032 B2 | 9/2009 | Seeds et al. |
| 7,670,219 B2 | 3/2010 | Matousek et al. |
| 8,292,016 B1 | 10/2012 | Johnson et al. |
| 8,464,611 B1 | 6/2013 | Chandler |
| 8,726,622 B2 | 5/2014 | Wagner et al. |
| 9,750,192 B2 | 9/2017 | Mackin et al. |
| 2007/0199763 A1 | 8/2007 | Henze et al. |
| 2014/0260158 A1 | 9/2014 | Nelson et al. |

FOREIGN PATENT DOCUMENTS

| BR | 0405126 A | 10/2005 |
|---|---|---|
| CN | 103029577 A | 4/2013 |
| GB | 2024595 A | 1/1980 |

OTHER PUBLICATIONS

Extended European Search Report for EP Application No. 19165349.2 dated Oct. 7, 2019 (five pages).

*Primary Examiner* — Robert E Pezzuto
(74) *Attorney, Agent, or Firm* — Peter Zacharias; Patrick Sheldrake (57) ABSTRACT

A modular axle assembly for supporting wheels of an agricultural vehicle, such as a combine harvester. The modular axle assembly includes a first tube, a second tube parallel to the first tube, and at least one bracket connecting the first tube and the second tube.

20 Claims, 13 Drawing Sheets

MODULAR COMBINE TRACTION AXLE

FIELD OF THE INVENTION

The present invention relates to a rigid axle for a combine harvester.

BACKGROUND OF THE INVENTION

Many agricultural operators desire combines that have greater harvesting and grain processing and handling capacity. One way to increase harvesting and grain processing and handling capacity is to add an additional cleaning fan, which may also be referred to herein as a pre-blower, at or near the front axle of the combine. The pre-blower is used to generate a rearwardly directed flow of air to sieves of a cleaning system for removing material other than grain from the grain itself before it is conveyed to the grain tank or offloaded.

Adding the pre-blower at or near the front axle of the combine presents a substantial design challenge because a standard rigid front axle cannot accommodate the physical envelope of the pre-blower. Thus, the front axle must be modified to accommodate the physical envelope of the pre-blower. The front axle must be modified because it is not possible to simply increase the overall size envelope of the combine. The overall size envelope of the combine is limited by width restrictions for passage over public roads, thoroughfares, bridges and the like, by height restrictions for passage under overhead wires and through doors of storage and service buildings, and trailer transport restrictions.

As another challenge, there are a variety of different combine models (e.g., single wheel (one wheel on each side of the axle), dual wheel, tracks, etc., and it would beneficial from the cost and inventory perspectives to have one axle structure that is capable of being employed in all of those different combine models.

What is sought is a light-weight rigid axle for a combine that will (i) accommodate the physical envelope of the additional cleaning fan, (ii) work with the variety of different combine styles, and (iii) safely and durably support the weight of the combine machine.

SUMMARY OF THE INVENTION

Described herein is a modular axle assembly for supporting the wheels of an agricultural vehicle. The wheels may be wheels having pneumatic tires or wheels for driving an endless track. The modular axle assembly may be used with a variety of agricultural vehicles, not limited to a single or dual front wheel combine and a front track combine. The modular axle assembly accommodates different variations of feeder pivot locations, feeder lengths and lift geometry.

More particularly, according to one aspect of the invention, the modular axle assembly for supporting wheels of an agricultural vehicle includes a first tube, a second tube parallel to the first tube, and at least one bracket connecting the first tube and the second tube.

According to another aspect of the invention, a combine harvester comprises a front axle assembly including a first tube, a second tube parallel to the first tube, and at least one bracket connecting the first tube and the second tube. At least two wheels are connected to the front axle assembly. A pre-blower is mounted to the front axle assembly and positioned at least partially between the first tube and the second tube. The pre-blower is configured for delivering air into a cleaning system of the combine harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, in FIG. 1, a combine harvester 100 (hereinafter also referred to as "combine 100") is shown including a rigid axle structure 200 (referred to hereinafter as axle 200) to which drive wheels 124 are connected. A pre-blower cleaning fan 116 is mounted to the axle 200 for blowing a flow of air upwardly and rearwardly, as denoted by arrows in FIG. 1, through sieves of a cleaning system 118 of the combine 100. The cleaning system 118 is operable in the well-known manner for separating material other than grain from grain harvested by combine 100. A feeder 126 is connected to the front end of the combine 100 for delivering crop material into the threshing system 128 of the combine 100.

Figure 1:
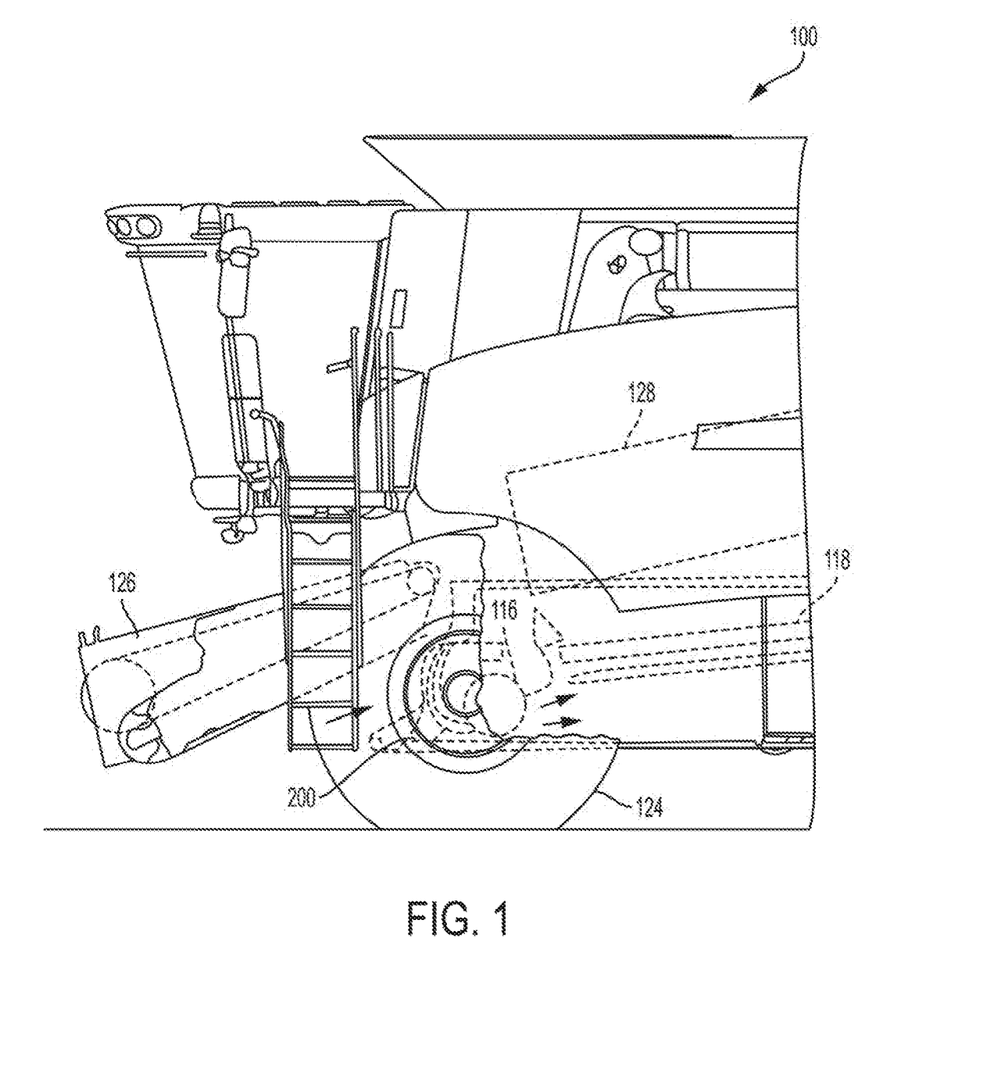
FIG. 1 is a schematic view of a combine harvester.

The forward and mid portions of the combine 100 are illustrated in FIG. 1, and it is contemplated that the axle 200 is preferably configured for use in connection with forwardly located drive wheels of a combine, although the present invention is not intended to be limited by that application. Other details of the combine 100 are disclosed in U.S. Pat. No. 7,670,219, which is incorporated by reference herein in its entirety.

Figure 2A:
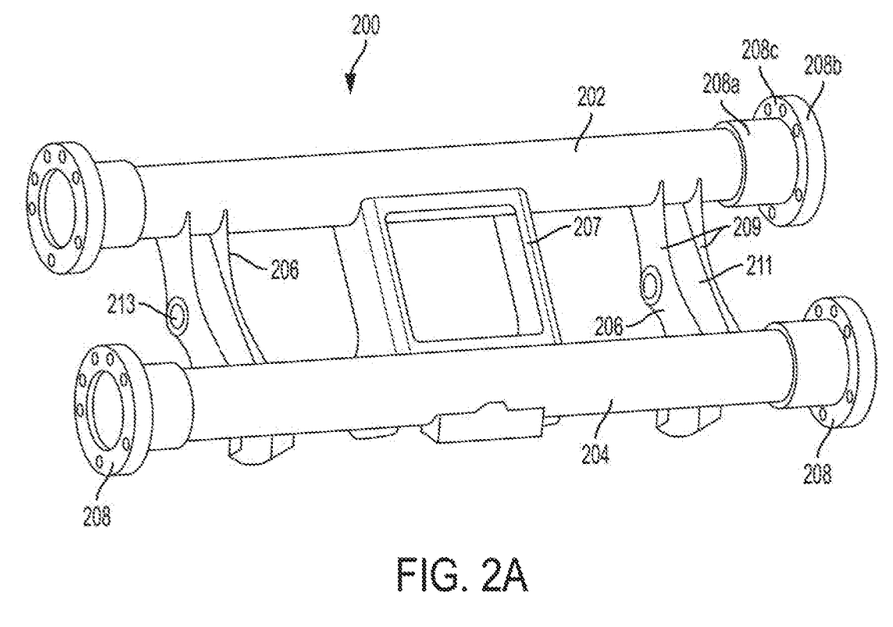
FIG. 2A is an isometric view of the front facing side of a rigid and modular front axle of the combine.
Figure 2B:
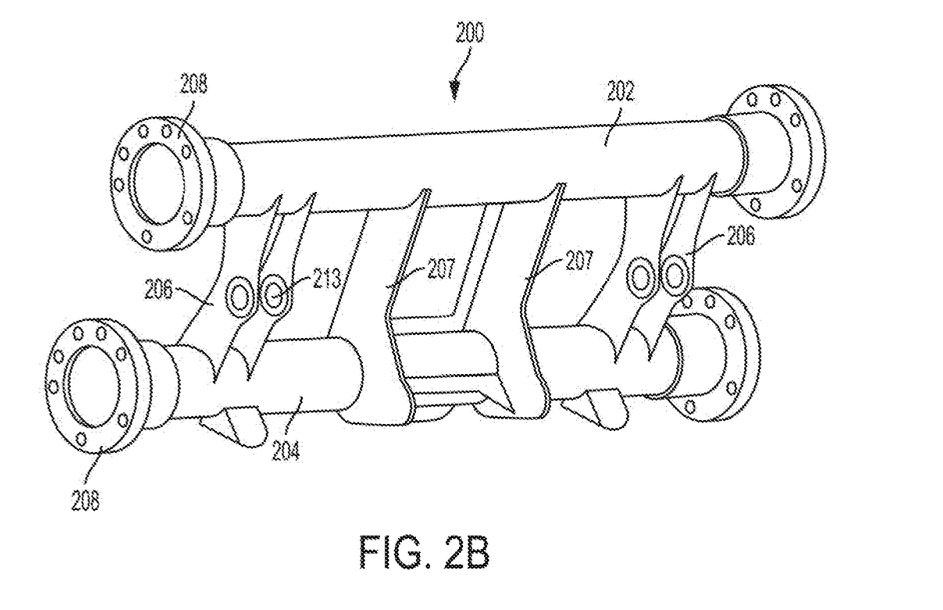
FIG. 2B is an isometric view of the rear facing side of the front axle of FIG. 2A.

Referring now to FIGS. 2A and 2B, the axle 200 generally comprises an upper tube 202 that is mounted to a lower tube 204 by a series of brackets 206 and 207. Each tube 202 and 204 is (optionally) a hollow structure in the interest of reducing weight. Alternatively, the tubes 202 and 204 could be solid structures.

It should be understood that neither the axle 200 nor its tubes 202 and 204 are rotated during operation. In other words, the axle 200 is stationary and rigid during operation. However, according to a different embodiment, the tubes may be rotatable shafts.

A hollow cylindrical flange 208 is mounted to each end of each of the tubes 202 and 204. Each flange 208 includes a hollow small diameter portion 208a for fitting over the end of a tube 202, 204. The small diameter portion 208a may be connected to the tube 202, 204 by a weld, for example. Each flange 208 also includes a large diameter portion 208b having transverse holes 208c that pass there through. Fasteners (not shown) pass through the holes 208c for fastening the large diameter portion 208b of the flange 208 to another component that is mated to the axle 200.

The brackets 206 connect the tubes 202, 204 to each other and are spaced apart along the length dimension of the tubes 202, 204. The ends of each bracket 206 are fixed to the tubes 202, 204 by a weld, for example. Each bracket 206 comprises two V-shaped plates 209 that are spaced apart by a predetermined distance. An opening 213 is disposed in each plate 209. A support member 211 is positioned between the adjacent plates 209.

The bracket 207 is box shaped, and also connects the tubes 202, 204 to each other. The bracket 207 is positioned between the brackets 206. The ends of the bracket 207 are fixed to the tubes 202, 204 by a weld, for example. The top surface of the bracket 207 is rounded to conform to the cylindrical body of the tube 202. Similarly, the bottom surface of the bracket 207 is rounded to conform to the cylindrical body of the tube 204.

A transmission for moving the wheels 124 of the combine 100 may be connected to the bracket 207, as is disclosed in U.S. Pat. No. 7,670,219 and shown in FIG. 9B.

Figure 9A:
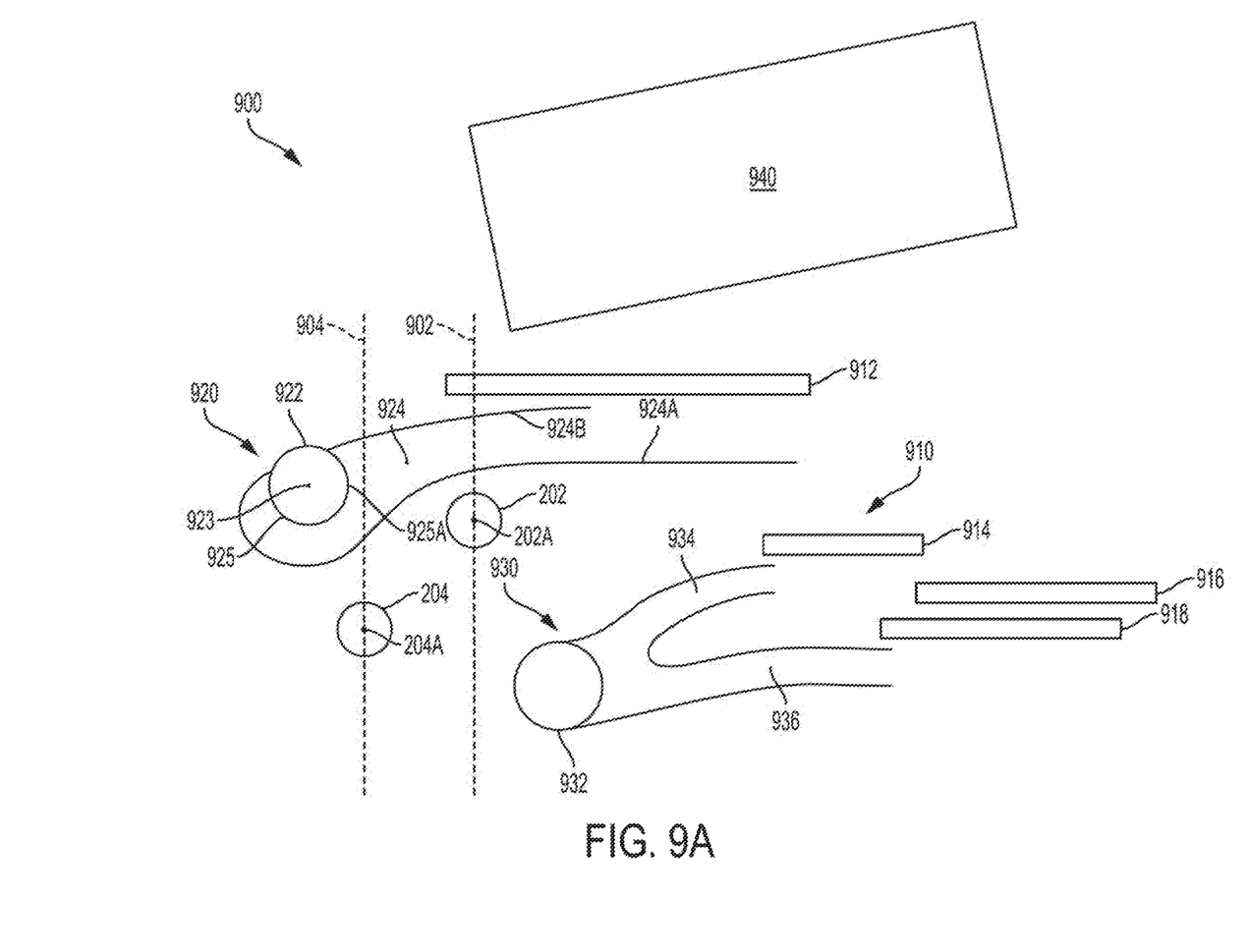
FIG. 9A illustrates a cross-sectional view of a cleaning system of a combine harvester, the combine harvester comprising the front axle assembly of FIG. 5 and at least one fan system.

As shown in FIG. 9A, a pre-blower 922 may be at least partially positioned between the tubes 202, 204. Replacing a large solid axle with the two tubes 202 and 204 provides clearance space for accommodating at least a portion of the pre-blower 922. Various other components may be connected to the brackets 206 and 207.

The axle 200 is a modular base unit meaning that a variety of components can be connected, either directly or indirectly, to the axle 200 in order to form different front axle assemblies. Various front axle assemblies are described hereinafter, each of which incorporates the modular axle 200.

The axle 200 is a light-weight rigid axle for a combine that will (i) accommodate the physical envelope of the additional cleaning fan, (ii) work with the variety of different combine styles, and (iii) safely and durably support the weight of the combine machine.

Figure 3A:
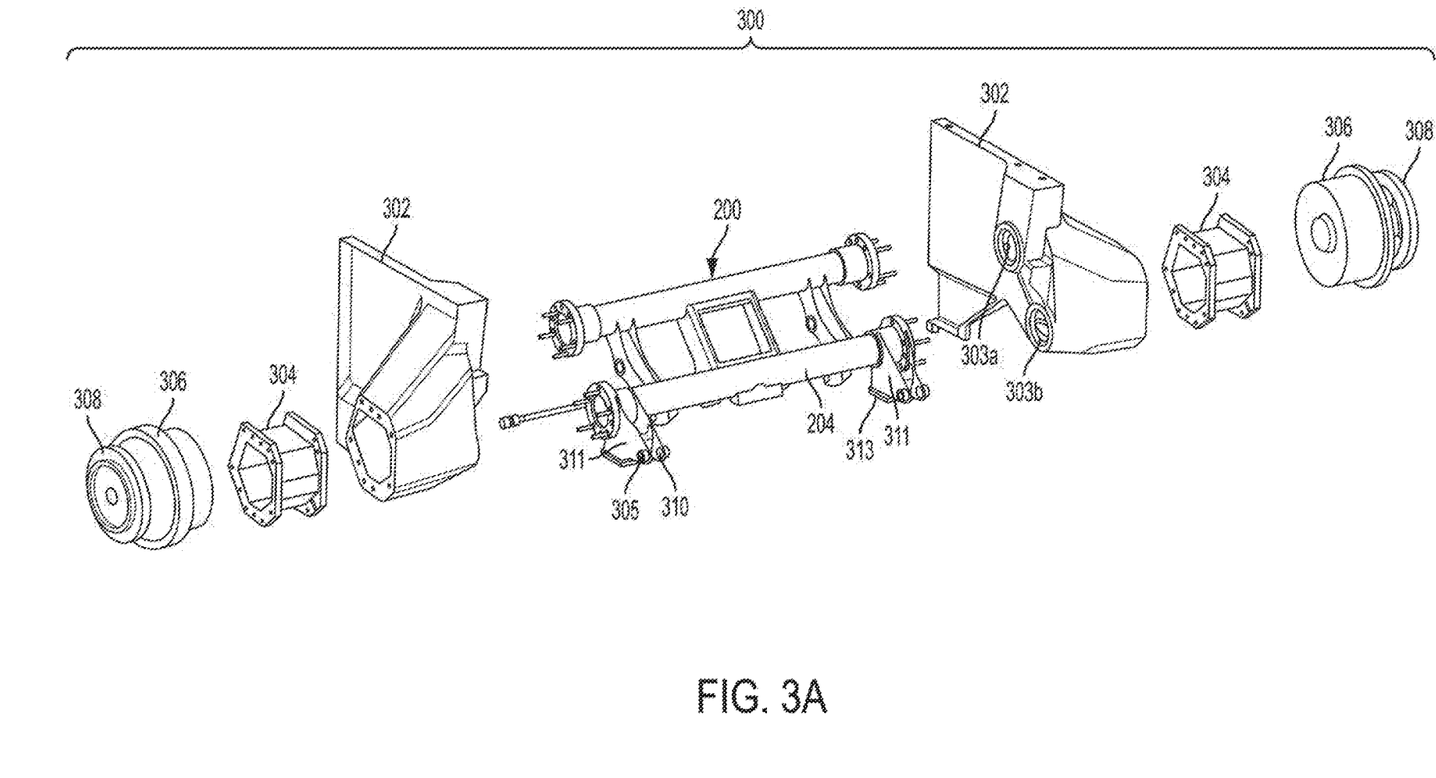
FIG. 3A depicts an isometric front view of a front axle assembly, shown exploded, for a dual front wheel combine.
Figure 3B:
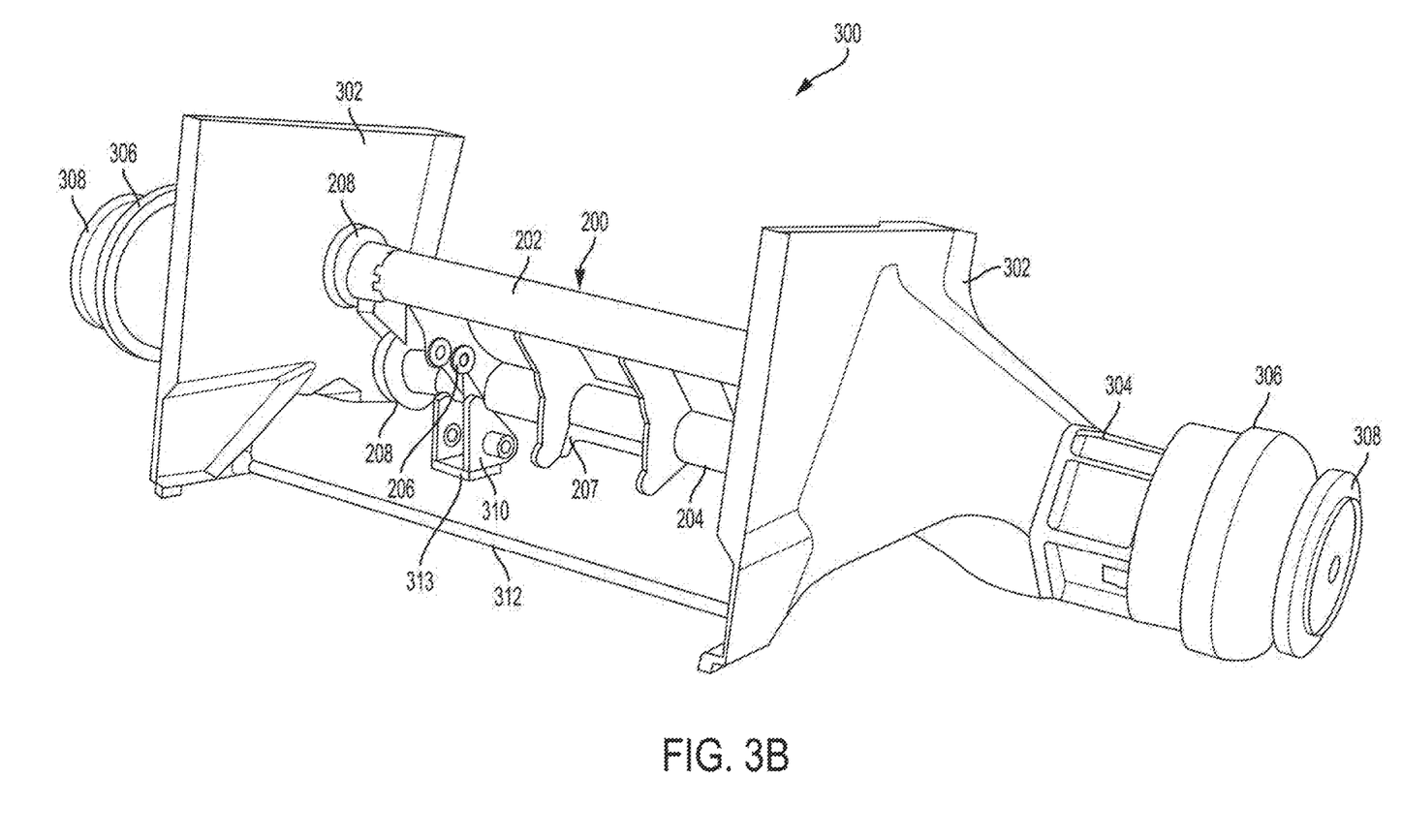
FIG. 3B depicts an isometric rear view of the front axle assembly of FIG. 3A.

FIGS. 3A and 3B depicts a rigid front axle assembly 300 for a dual front wheel combine. The rigid front axle assembly 300 comprises the axle 200.

Mounts 310 are fixed to opposing ends of the lower tube 204 of the axle 200. According to one exemplary embodiment, each mount 310 comprises two triangular shaped flanges 311 that extend forward of the tube 204, and include openings 305 defined therethrough. The flanges 311 are welded (or otherwise fixedly mounted) to the tube 204. A plate 313 is mounted to the lower edge of the adjacent flanges 311. The mounts 310 provide a suitable jacking or cribbing location for the combine.

Although not shown, hydraulic cylinders (not shown) extending from the feeder 126 are releasably connected to the openings 305 in the respective mounts 310 for pivoting the feeder 126 with respect to the combine. The interconnection between a hydraulic cylinder, a feeder and a combine axle is shown in U.S. Pat. No. 8,726,622, which is incorporated by reference in its entirety. As will be described in detail later, the structure of each mount can vary.

On each side of the axle 200, a wheel support member 302 is bolted (or otherwise mounted) to both of the tubes 202 and 204 of the axle 200, an axle extension 304 is bolted (or otherwise mounted) to a laterally outwardly face of the wheel support member 302, and a planetary final drive 306 is bolted (or otherwise mounted) to a laterally outwardly face of the axle extension 304.

Each planetary final drive includes a rotating plate 308. Although not shown, two front wheels are mounted to each plate 308 such that the axle assembly 300 supports a total of four front wheels. According to this exemplary embodiment, the final drive 306 is a planetary final drive, however, the final drive 306 could be a bull gear final drive, an electric motor, a hydraulic motor, a pneumatic motor, or another other type of final drive known to those skilled in the art.

The wheel support member 302 is mounted to the frame of the combine and is a structural member of the combine to which other components are mounted. The wheel support member 302 includes flange mounting areas 303a and 303b to which the flanges of the tubes 202, 204 are mounted.

A tie rod 312 is a rigid member having opposite ends, each end being mounted to one of the wheel support members 302. Like the tubes 202 and 204, the tie rod 312 provides structural stability and rigidity to the axle assembly 300. The tubes 202 and 204 and the tie rod 312 are oriented in a triangular fashion (as viewed from the side of the axle assembly 300). Although not shown, each of the axle assemblies described hereinafter may include a tie rod 312. The tie rod 312 is an optional component and may be omitted.

The axle extensions 304 provide added length to each side of the axle assembly 300 such that two wheels can be mounted to each side of the axle assembly. If, however, only a single front wheel is mounted to each side of the axle 200, then both axle extensions 304 may be omitted, and the planetary final drives 306 may be mounted directly to respective wheel support members 302.

As will be described with reference to FIGS. 9B and 9C, an output shaft of the transmission is coupled to both of the planetary final drives 306. In operation, the transmission rotates the plates 308 of the planetary final drives 306 for driving all four front wheels. It should be understood that the wheel support member 302 and the axle extension 304 remain stationary in operation.

Figure 4:
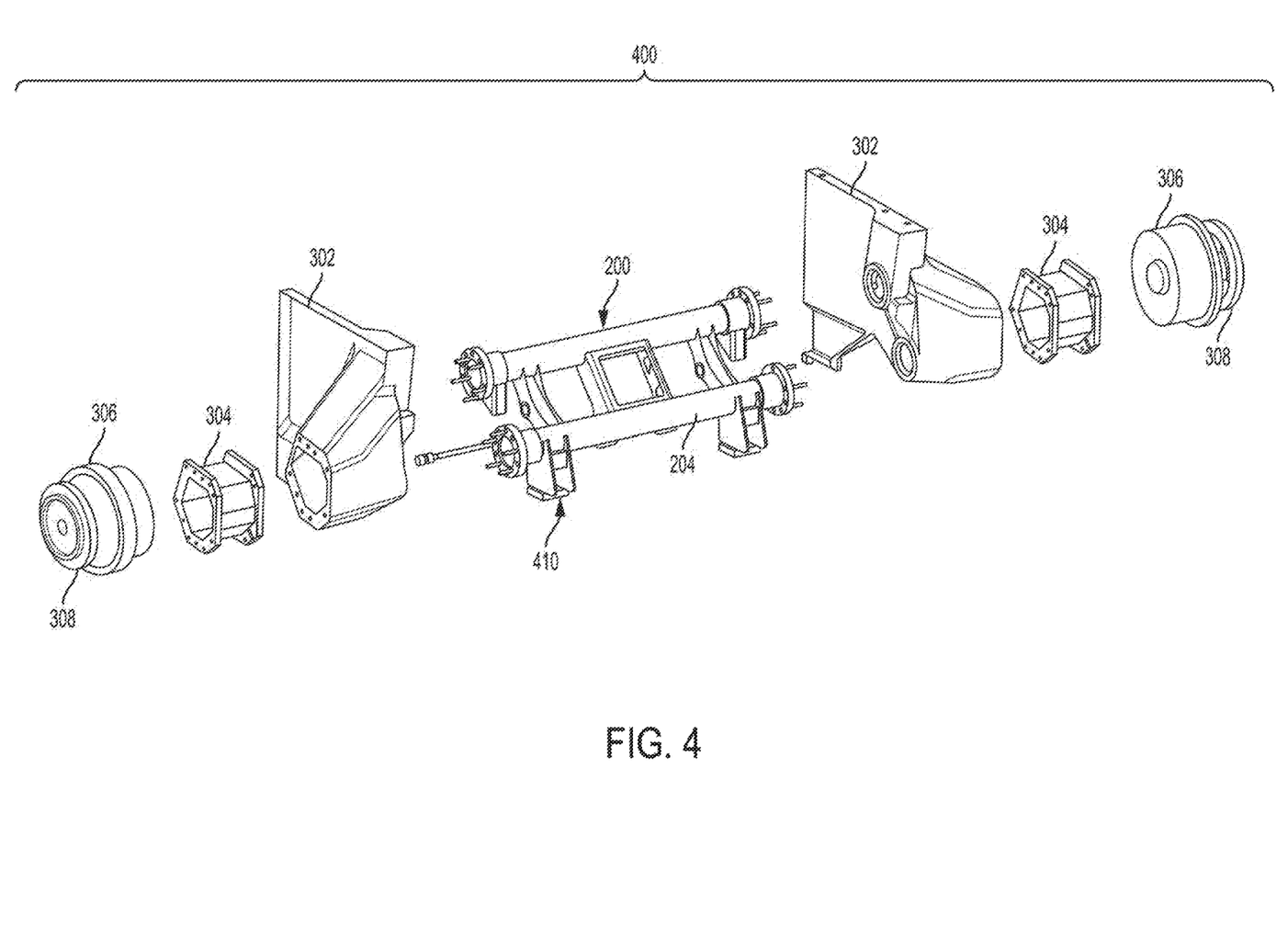
FIG. 4 depicts an isometric front view of a front axle assembly, shown exploded, for another dual wheel combine.

FIG. 4 depicts a rigid front axle assembly 400 for another dual front wheel combine. The primary difference between the front axle assemblies 300 and 400 is that the axle 200 of the front axle assembly 400 includes different mounts 410. The mounts 410 provide a suitable jacking or cribbing location. The mounts 410 are configured for connecting to the hydraulic cylinders of a feeder of the combine. It is envisioned that the mounts 310 and 410 could be combined into a single universal mount, if so desired.

Figure 5:
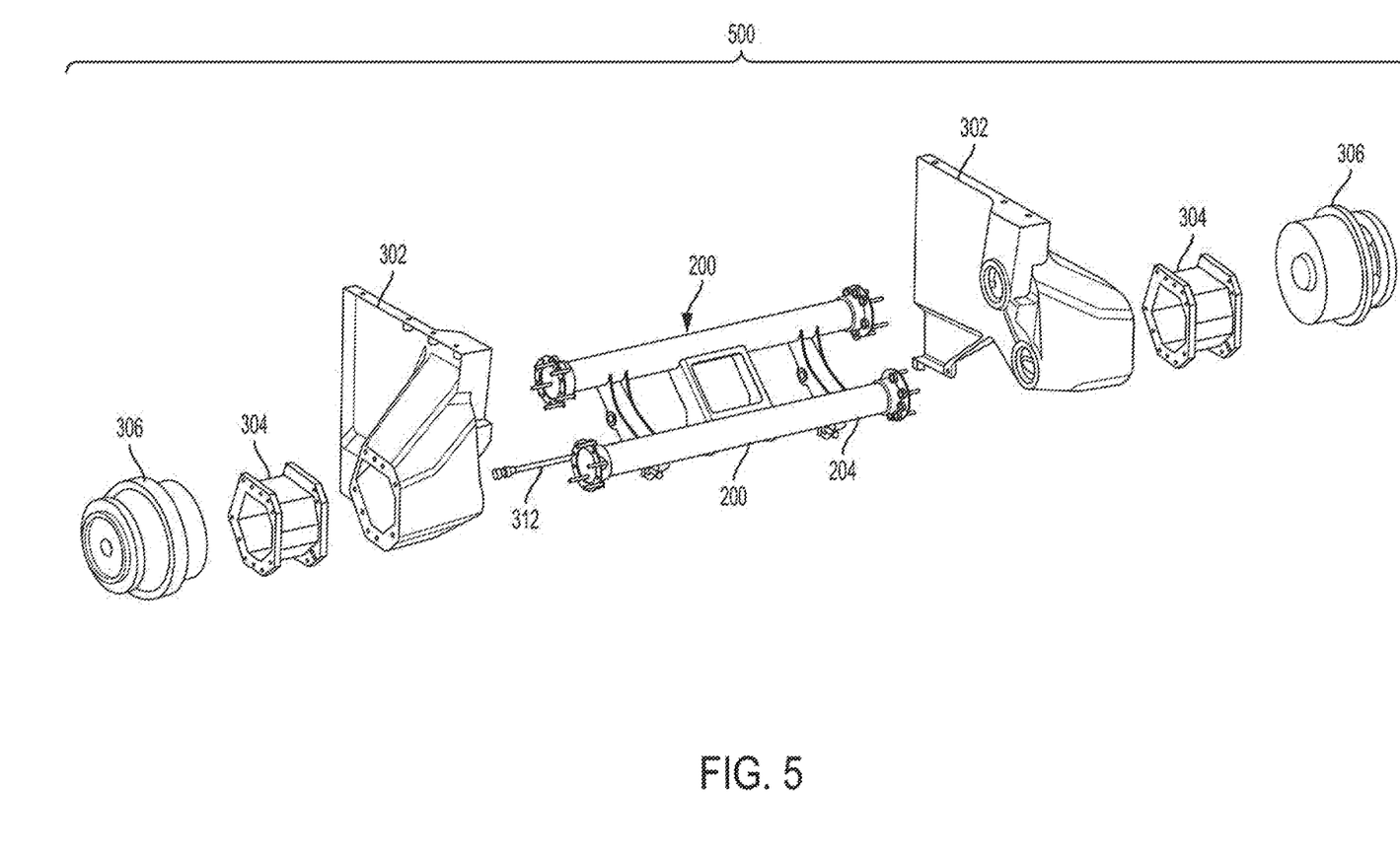
FIG. 5 depicts an isometric front view of a front axle assembly, shown exploded, for yet another dual wheel combine.

FIG. 5 depicts a rigid front axle assembly 500 for yet another dual front wheel combine. The primary difference between the front axle assemblies 300 and 500 is that the mounts for the front axle assembly 500 are not shown. The mounts for the front axle assembly 500 may form part of the feeder of the combine.

Figure 6:
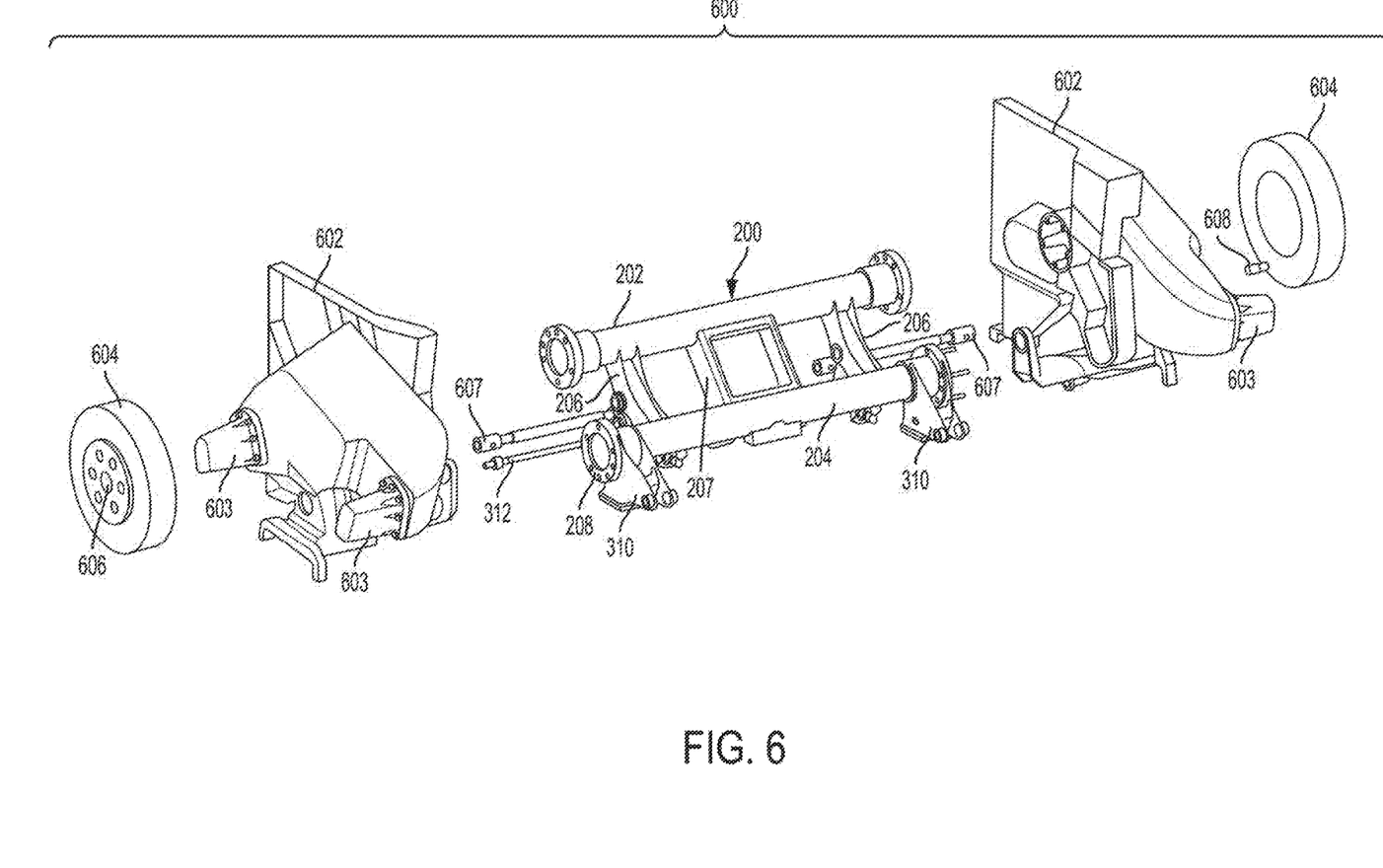
FIG. 6 depicts an isometric front view of a front axle assembly, shown exploded, for a front track combine.

FIG. 6 depicts a rigid front axle assembly 600 for a front track combine. The rigid front axle assembly 600 comprises the axle 200 having mounts 310. The features of the axle 200 and the mounts 310 are described above.

On each side of the axle 200, a wheel support member 602 is bolted (or otherwise mounted) to both of the tubes 202 and 204 of the axle 200, and a bull gear final drive 604 is bolted (or otherwise mounted) to an outwardly facing side of the wheel support member 602.

The track support member 602 is mounted to the frame of the combine and is a structural member of the combine to which other components are mounted. Travel limiters 603 protrude outwardly from each track support member 602 to limit rotation of the track assemblies with respect to the axle 200.

Each bull gear final drive 604 includes a rotating plate 606. Although not shown, a wheel is mounted to the plate 606, and that wheel spins an endless track. A representative endless track is disclosed in U.S. Pat. No. 6,929,334, which is incorporated by reference herein in its entirety and for all purposes.

Rotatable output shafts 607 extending from the transmission (not shown in this figure) are physically coupled to the bull gear final drives 604. In operation, the transmission rotates the shafts 607, and each shaft 607 rotates an input shaft 608 of the bull gear final drive 604, which rotates the plate 606. Rotation of the plate 606 causes rotation of the endless track that is indirectly connected to the plate 606. It should be understood that the track support member 602 remains stationary during operation.

Figure 7:
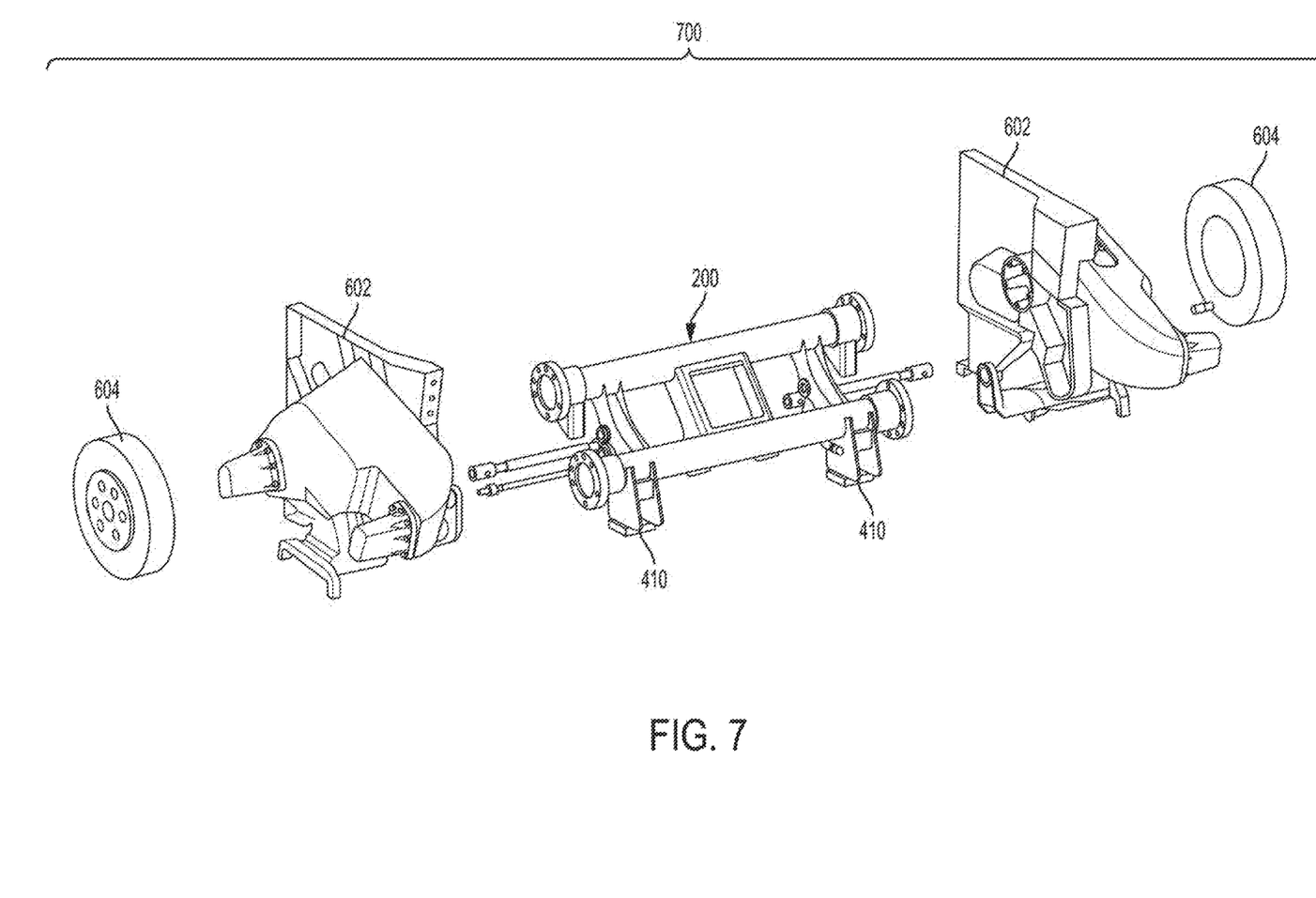
FIG. 7 depicts an isometric front view of a front axle assembly, shown exploded, for another front track combine.

FIG. 7 depicts a rigid front axle assembly 700 for another front track combine. The primary difference between the front axle assemblies 600 and 700 is that the axle 200 of the front axle assembly 700 includes the mounts 410 instead of the mounts 310. As noted above, the mounts 410 are configured for connecting to the hydraulic cylinders of the feeder of the combine.

Figure 8:
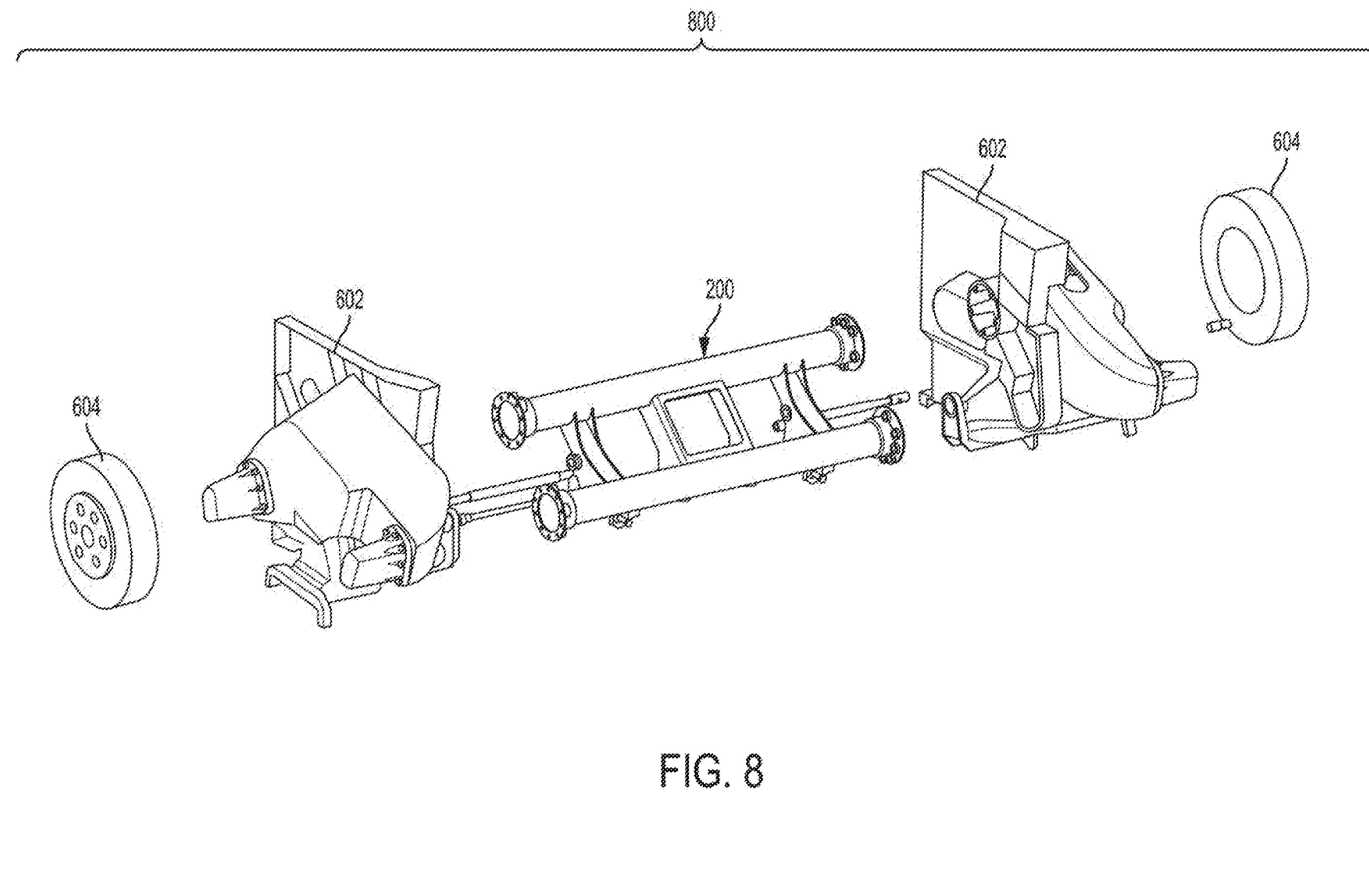
FIG. 8 depicts an isometric front view of a front axle assembly, shown exploded, for yet another front track combine.

FIG. 8 depicts a rigid front axle assembly 800 for yet another front track combine. The primary difference between the front axle assemblies 600 and 800 is that the mounts for the front axle assembly 800 are not shown. The mounts for the front axle assembly 800 may form part of the feeder of the combine.

Referring now to FIG. 9A, there is illustrated a cleaning system 900 and a threshing system 940 for the combine 100, in accordance with an exemplary embodiment of the present invention. The cleaning system 900 comprises a cleaning shoe 910, a first blower assembly 920, and a second blower assembly 930. The cleaning shoe 910 comprises a grain pan 912, a pre-sieve 914, a chaffer or upper sieve 916, and a lower sieve 918. The grain pan 912 receives grain and material other than grain ("MOG") from an anterior portion of the threshing system 940, and the pre-sieve 914 receives grain and MOG from a posterior portion of the threshing system 940. The cleaning system 910 separates grain from MOG.

The first blower assembly 920 comprises a fan 922 and an outlet duct 924 formed from at least a lower sheet 924A and an upper sheet 924B. The first blower assembly 920 is configured to blow air into the cleaning shoe 910 to facilitate the separation of grain from MOG.

The second blower assembly 930 comprises a fan 932 and outlet ducts 934 and 936. The second blower assembly 930 is configured to blow air into the cleaning shoe 910 to facilitate the separation of grain from MOG.

The first blower assembly 920 is configured to blow air into the cleaning shoe 910 upstream from the second blower assembly 930. Specifically, the fan 922 and the duct 924 direct air near the grain pan 912, the duct 934 is configured to direct air from the fan 932 to an area above the pre-sieve 914, and the duct 936 is configured to direct air from the fan 932 through the pre-sieve 914. The ducts 934 and 936 facilitate separation of grain from MOG. The pre-sieve 914 is located in the cleaning shoe 910 downstream from the grain pan 912.

The first blower assembly 920, specifically the fan 922, is positioned so that at least a portion of the first blower assembly 920, specifically at least a portion of the fan 922, is disposed between the tubes 202 and 204. As shown, the tube 202 comprises a longitudinal axis 202A, and the tube 204 comprises a longitudinal axis 204A. In an exemplary embodiment, at least a downstream and innermost point 925A of an outer periphery 925 of the fan 922 is disposed between a vertical plane 902 passing through longitudinal axis 202A and a vertical plane 904 passing through the longitudinal axis 204A. The placement of the first blower assembly 920, specifically the fan 922, at the axle 200 provides for the ability to include the first blower assembly 920 in the combine 100 and for more flexibility in the placement of the duct 924.

In an exemplary embedment, the first blower assembly 920 is a pre-blower assembly in which the fan 922 is a pre-blower for fluidizing the grain and MOG mat on the grain pan 912 or coming off the grain pan 912. In such embodiment, the second blower assembly 930 is a primary blower assembly, and the fan 932 is a primary fan. Other embodiments of the cleaning system 900 in which only the first blower assembly 920 is present are contemplated. In such other exemplary embodiments, the duct 924 may be directed to direct air to other portions of the cleaning assembly 900. In an exemplary embodiment, the fan 922 is a cross-flow fan.

Figure 9B:
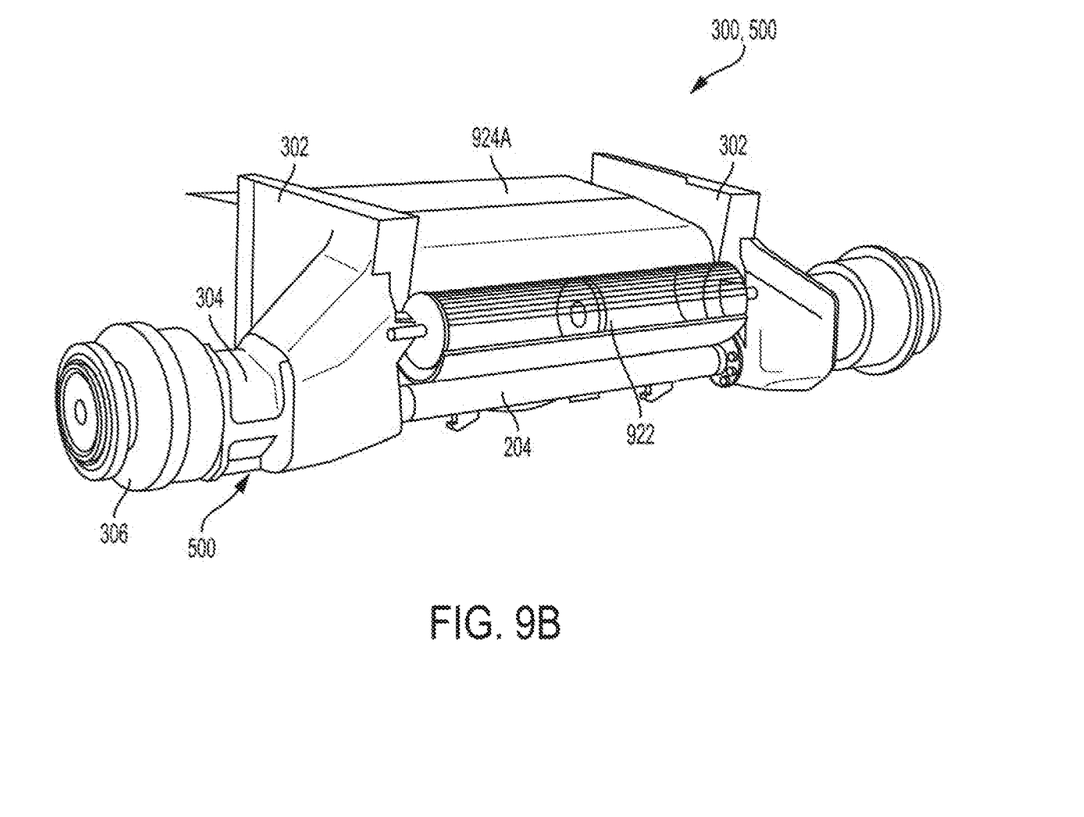
FIG. 9B is an isometric front view of the front axle assembly of FIG. 5 in the combine harvester shown with a transmission and the at least one fan system of FIG. 9A.
Figure 9C:
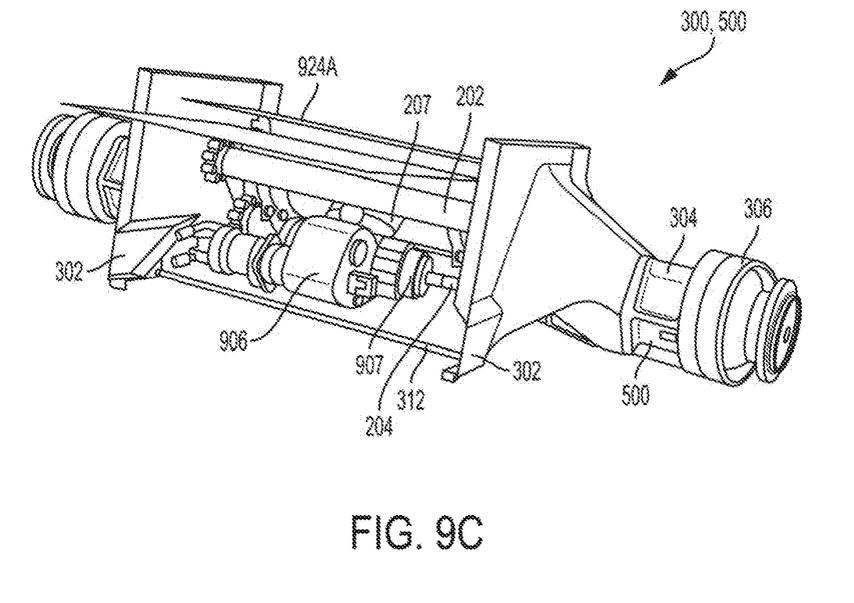
FIG. 9C is an isometric rear view of the front axle assembly shown in FIG. 9B.

FIGS. 9B and 9C depict the front axle assembly 300, 500 for the dual front wheel combine 100 with the fan 922 and a transmission 906 mounted to the rigid front axle assembly 500.

More specifically, the transmission 906 for moving the planetary final drives 306 (and, thus, the wheels 124 of the combine 100) is mounted to the rear side of the bracket 207. Shafts 907 (one shown) extending from the both sides of the transmission 906 are either directly or indirectly connected to the planetary final drives 306. Replacing a large solid axle with the two tubes 202 and 204 provides clearance space for accommodating at least a portion of the transmission 906 in the space previously occupied by a large solid axle.

The fan 922 is at least partially positioned between the tubes 202, 204 and mounted both to and between the wheel support members 302. As seen in FIG. 9B, the lower duct wall 924A, in the form of a sheet, is also mounted to the wheel support members 302 for directing the air produced by the fan 922 over the top tube 202 toward the cleaning system 900 of the combine 100. Replacing a large solid axle with the two tubes 202 and 204 provides clearance space for accommodating at least a portion of the fan 922. Various other components may be connected to the brackets 206 and 207 and wheel support members 302.

It should be understood that the pre-blower fan 902, duct 904, and transmission 906 may be mounted in a similar manner to any of the combine sub-assemblies described herein and shown in FIGS. 3A-8.

It can be appreciated that each front axle assembly described herein includes the same axle 200. Modularizing the axle 200 such that it accommodates a large variety of combine styles is advantageous from the inventory and cost perspectives.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester comprising:
   a front axle assembly including a first tube, a second tube parallel to the first tube, and at least one bracket connecting the first tube and the second tube;
   at least two wheels connected to the front axle assembly;
   a cleaning system comprising:
      a cleaning shoe; and
      a fan mounted to the front axle assembly and positioned at least partially between the first tube and the second tube, the fan being configured for delivering air into the cleaning shoe; and
   a transmission mounted to the at least one bracket for powering the at least two wheels, the transmission being positioned at least partially between the tubes.

2. The combine harvester of claim 1 further comprising a first wheel support member mounted to first ends of the first tube and the second tube, and a second wheel support member mounted to second ends of the first tube and the second tube.

3. The combine harvester of claim 2, wherein the fan has an outer periphery having a point that is disposed between longitudinal axes of the first and second tubes.

4. The combine harvester of claim 2 further comprising one of a planetary final drive and a bull gear final drive mounted to each wheel support member.

5. The combine harvester of claim 4, wherein said one of the planetary final drive and the bull gear final drive mounted to each wheel support member is configured to be connected to a respective one of the at least two wheels.

6. The combine harvester of claim 2, wherein each end of the first tube and the second tube includes a flange, and each flange is mounted to one of the wheel support members.

7. The combine harvester of claim 1 further comprising mounts connected to the first tube that are configured to be connected to a feeder of the combine harvester.

8. The combine harvester of claim 1 further comprising two additional brackets connecting the first tube and the second tube, said at least one bracket positioned between the additional brackets along a length dimension of the first tube and the second tube.

9. The combine harvester of claim 1, wherein the cleaning system further comprises a second fan configured to direct air into the cleaning shoe, wherein the fan mounted to the front axle assembly is configured for directing air into the cleaning shoe upstream of the second fan.

10. A combine harvester comprising:
    a front axle assembly including a first tube, a second tube parallel to the first tube, and at least one bracket connecting the first tube and the second tube;
    at least two wheels connected to the front axle assembly;
    a cleaning system comprising:
       a cleaning shoe; and
       a fan mounted to the front axle assembly and positioned at least partially between the first tube and the second tube, the fan being configured for delivering air into the cleaning shoe; and
    a first wheel support member mounted to first ends of the first tube and the second tube, and a second wheel support member mounted to second ends of the first tube and the second tube.

11. The combine harvester of claim 10, further comprising a transmission mounted to the at least one bracket for powering the at least two wheels, the transmission being positioned at least partially between the tubes.

12. The combine harvester of claim 10, wherein the fan has an outer periphery having a point that is disposed between longitudinal axes of the first and second tubes.

13. The combine harvester of claim 10 further comprising one of a planetary final drive and a bull gear final drive mounted to each wheel support member.

14. The combine harvester of claim 13, wherein said one of the planetary final drive and the bull gear final drive mounted to each wheel support member is configured to be connected to a respective one of the at least two wheels.

15. The combine harvester of claim 10, wherein each end of the first tube and the second tube includes a flange, and each flange is mounted to one of the wheel support members.

16. A combine harvester comprising:
    a front axle assembly including a first tube, a second tube parallel to the first tube, and at least one bracket connecting the first tube and the second tube;
    at least two wheels connected to the front axle assembly;
    a cleaning system comprising:
       a cleaning shoe; and
       a fan mounted to the front axle assembly and positioned at least partially between the first tube and the second tube, the fan being configured for delivering air into the cleaning shoe; and
    two additional brackets connecting the first tube and the second tube, said at least one bracket positioned between the additional brackets along a length dimension of the first tube and the second tube.

17. The combine harvester of claim 16 further comprising a transmission mounted to the at least one bracket for powering the at least two wheels, the transmission being positioned at least partially between the tubes.

18. The combine harvester of claim 16 further comprising a first wheel support member mounted to first ends of the first tube and the second tube, and a second wheel support member mounted to second ends of the first tube and the second tube.

19. The combine harvester of claim 18, wherein the fan has an outer periphery having a point that is disposed between longitudinal axes of the first and second tubes.

20. The combine harvester of claim 18 further comprising one of a planetary final drive and a bull gear final drive mounted to each wheel support member.

\* \* \* \* \*